N. C. LARSEN.
Purse or Satchel Fastener.

No. 227,022.  Patented April 27, 1880.

WITNESSES:
Chas. Nida.
C. Sedgwick

INVENTOR:
N. C. Larsen
BY Munn & Co.
ATTORNEYS.

UNITED STATES PATENT OFFICE.

NIELS C. LARSEN, OF SACRAMENTO, CALIFORNIA.

PURSE OR SATCHEL FASTENER.

SPECIFICATION forming part of Letters Patent No. 227,022, dated April 27, 1880.

Application filed February 13, 1880.

*To all whom it may concern:*

Be it known that I, NIELS C. LARSEN, of Sacramento, Sacramento county, California, have invented a new and Improved Purse or Satchel Fastener, of which the following is a specification.

Figure 1:
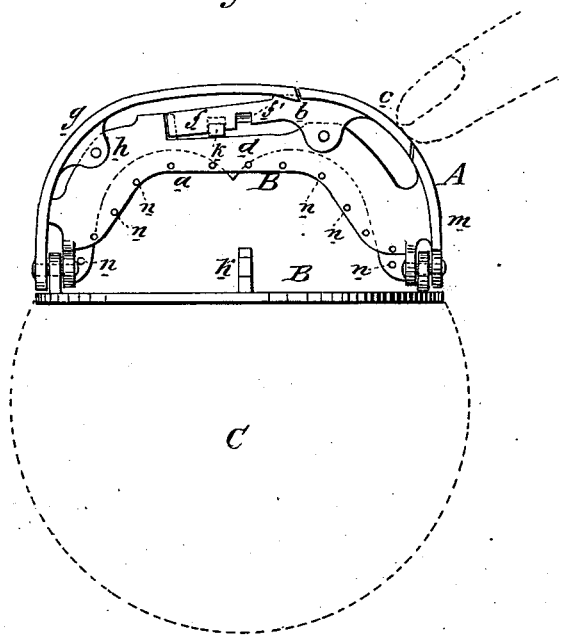
Figure 2:
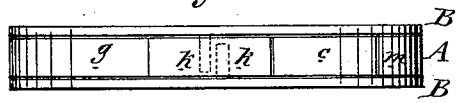
Figure 3:
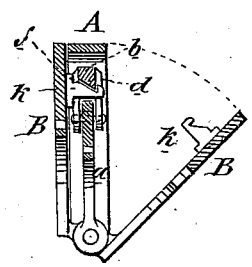

Figure 1 is a side elevation of the device partly opened. Fig. 2 is a plan of the fastener, and Fig. 3 is a vertical sectional elevation of the fastener partly open.

Similar letters of reference indicate corresponding parts.

The object of this invention is to furnish a purse or satchel fastening which can be securely locked and present a smooth and unbroken surface without projections.

The invention consists of a central bowed frame, to the ends of which are hinged, on either side, two bowed side plates, which plates are provided with hooked studs that enter into sockets formed in a lever that forms part of the central frame, said lever being held down to lock the side plates by a curved spring that also forms a part of the central frame.

In the drawings, A represents the central frame, consisting of a bowed rib, $a$, having pivoted to its upper edge a lever, $b$, one end of which lever $b$ extends upward and is flattened and curved, as shown at $c$, to form a section of the outer rim of the frame A, while the other end of the said lever is held down in a socket, $d$, which is formed in the upper edge of the said rib $a$, and this inner end of the lever $b$ is provided on each side with a beveled socket, $f$. The spring $g$, that forms the principal portion of the rim of the frame A, is pivoted at $h$ to the rib $a$, and the upper end of this spring $g$ presses upon the lever $b$ to hold it down in a locking position.

Pivoted at each end to the ends of the frame A are the side plates, B B, provided with hooked studs $k$ $k$.

When it is desired to lock the said fastener the side plates, B B, are turned up against the sides of the frame A and their studs $k$ $k$ are pressed into the sockets $f$ of the lever $b$.

When it is desired to unlock the said fastener pressure upon the said lever at $c$ in the rim of the frame A will cause the said lever $b$ and spring $g$ to be lifted, so as to release the studs $k$ $k$ of the side plates, B B.

The section $m$ of the rim of the frame A is stationary, and this section $m$, the portion $c$ of the lever, and the spring $g$ together form the entire rim of the frame A and present a smooth surface entirely free from projections.

This fastener may be attached to the purse or satchel represented at C by means of the small perforations $n$ $n$, made in the lower edges of the frame A and the side plates, B B.

Having thus described my invention, I claim as new and desire to secure by Letters Patent—

1. In a purse or satchel fastener, a socketed lever, $b$, in combination with the spring $g$, the said lever $b$ and spring $g$ forming part of the smooth rim of the frame of the fastener A, substantially as herein shown and described.

2. The combination, with the socketed lever $b$, spring $g$, and rib $a$ of the frame A, of the side plates, B B, provided with hooked studs $k$ $k$, substantially as herein shown and described.

3. The combination of the rib $a$, lever $b$, and spring $g$, substantially as herein shown and described, whereby a smooth rim, free from outward projections, is formed, as set forth.

NIELS CHRISTIAN LARSEN.

Witnesses:
FRANK G. WATERHOUSE,
JAMES O. COLEMAN.